US009586587B2

(12) United States Patent
Amano et al.

(10) Patent No.: US 9,586,587 B2
(45) Date of Patent: Mar. 7, 2017

(54) CONTROL SYSTEM FOR VEHICLE

(71) Applicant: TOYOTA JIDOSHA KABUSHIKI KAISHA, Toyota-shi (JP)

(72) Inventors: Hiroyuki Amano, Susono (JP); Yu Miyahara, Susono (JP); Yuji Suzuki, Kariya (JP); Hiroki Kondo, Miyoshi (JP); Tadashi Sekiguchi, Ashigarakami-gun (JP); Fusahiro Tsukano, Susono (JP); Atsushi Honda, Seto (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 14/933,458

(22) Filed: Nov. 5, 2015

(65) Prior Publication Data
US 2016/0129910 A1    May 12, 2016

(30) Foreign Application Priority Data

Nov. 7, 2014  (JP) .................................. 2014-227398
Sep. 24, 2015 (JP) .................................. 2015-186864

(51) Int. Cl.
*B60W 30/188* (2012.01)
*B60W 10/06* (2006.01)
*B60W 10/02* (2006.01)
*B60W 30/20* (2006.01)

(52) U.S. Cl.
CPC ...... *B60W 30/1882* (2013.01); *B60W 10/026* (2013.01); *B60W 10/06* (2013.01); *B60W 2030/206* (2013.01); *B60W 2510/0233* (2013.01); *B60W 2510/1005* (2013.01); *B60W 2710/0644* (2013.01); *B60W 2710/0666* (2013.01); *B60Y 2300/58* (2013.01)

(58) Field of Classification Search
None
See application file for complete search history.

(56) References Cited

U.S. PATENT DOCUMENTS

| | | | | |
|---|---|---|---|---|
| 2001/0021683 A1* | 9/2001 | Takagi | .................. | B60W 10/06 477/37 |
| 2001/0049319 A1* | 12/2001 | Yamamoto | ............ | B60W 10/06 477/111 |
| 2002/0014958 A1* | 2/2002 | Inoue | .................... | B60W 10/02 340/453 |

(Continued)

FOREIGN PATENT DOCUMENTS

| | | |
|---|---|---|
| JP | 2004-270718 | 9/2004 |
| JP | 2013-44370 | 3/2013 |
| JP | 2013-113348 | 6/2013 |

*Primary Examiner* — Justin Holmes
(74) *Attorney, Agent, or Firm* — Oblon McClelland, Maier & Neustadt, L.L.P.

(57) ABSTRACT

A controller is configured to obtain a speed ratio equivalent value that is determined by a speed ratio set in a transmission unit, and is configured to control an engine by setting an operating point of the engine such that the operating point in the case where a lockup clutch is engaged and the speed ratio equivalent value is large is lower in an output rotation speed for a predetermined output torque than the operating point in the case where the lockup clutch is engaged and the speed ratio equivalent value is smaller than the large speed ratio equivalent value.

10 Claims, 14 Drawing Sheets

(56) References Cited

U.S. PATENT DOCUMENTS

| | | | | |
|---|---|---|---|---|
| 2002/0072441 A1* | 6/2002 | Inoue | ................ | F16H 61/66259 |
| | | | | 474/18 |
| 2004/0064231 A1* | 4/2004 | Oohori | ................ | B60W 10/06 |
| | | | | 701/54 |
| 2014/0206500 A1* | 7/2014 | Kumazaki | ................ | B60K 6/44 |
| | | | | 477/4 |

* cited by examiner

F I G . 2
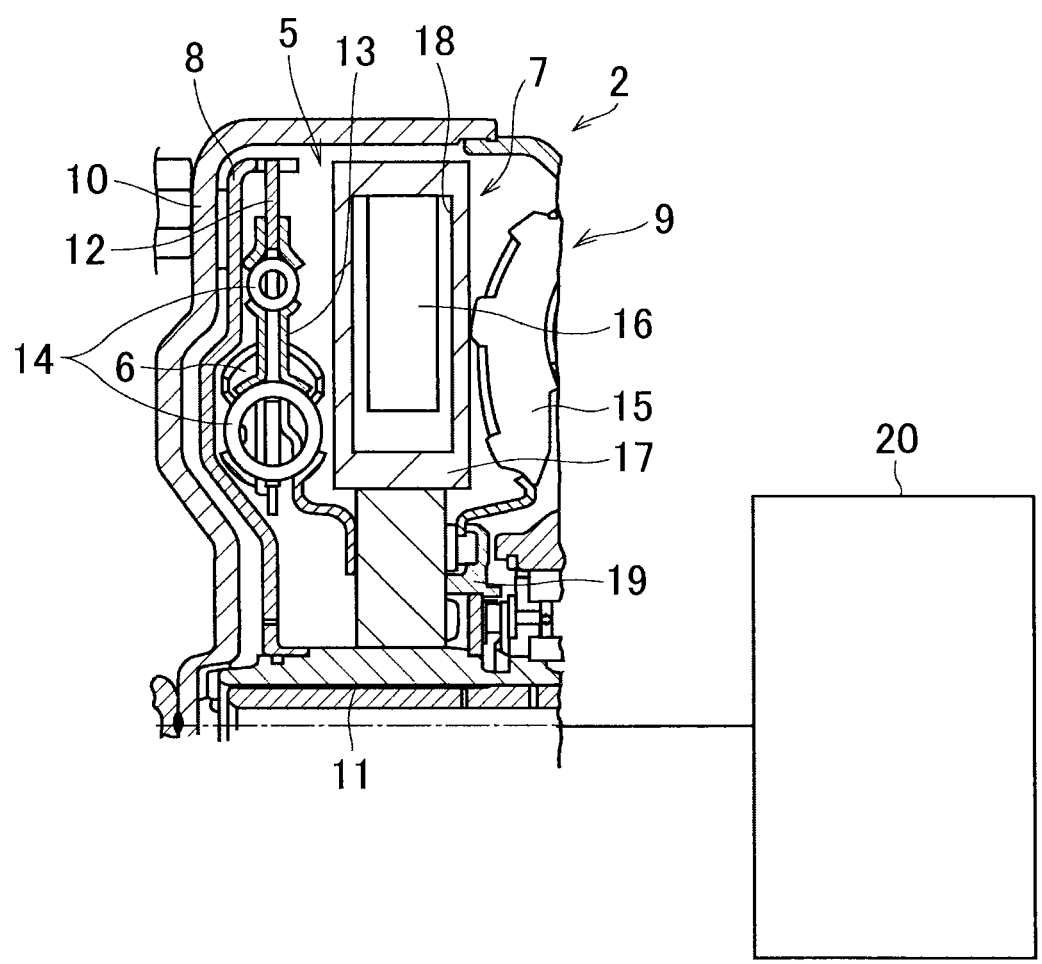

CONTROL SYSTEM FOR VEHICLE

INCORPORATION BY REFERENCE

The disclosure of Japanese Patent Application No. 2014-227398 and No. 2015-186864 filed on Nov. 7, 2014 and Sep. 24, 2015 including the specification, drawings and abstract is incorporated herein by reference in its entirety.

BACKGROUND OF THE INVENTION

1. Field of the Invention

The invention relates to a control system for a vehicle including a powertrain in which an engine and a transmission are coupled to each other via a damper device and, more particularly, to a system that controls a rotation speed or operating point of the engine.

2. Description of Related Art

A damper device is arranged on an output side of an engine for the purpose of improving a ride comfort of a vehicle or reducing noise by suppressing fluctuations in torque that is transmitted to drive wheels. Japanese Patent Application Publication No. 2013-113348 (JP 2013-113348 A) describes a torsional vibration reduction device having the following configuration. A spring damper is arranged between an output shaft of an engine and a torque converter, and a pendulum damper is connected to an output-side (driven-side) member of the spring damper.

In the system described in JP 2013-113348 A, because the pendulum damper is coupled to the driven-side member of the spring damper, the overall vibration damping characteristic of the torsional vibration reduction device may change depending on an inertial mass that is exerted on the pendulum damper. That is, the pendulum damper includes pendulums (or rolling elements) as inertial mass bodies; however, the mass of a rotary member that is coupled to the pendulum damper functions as an inertial mass body depending on the manner of coupling the rotary member to the pendulum damper. Conventionally, not focusing on the characteristics of such a pendulum damper or dynamic damper, the overall vibration damping characteristics of the torsional vibration reduction device including the spring damper and the pendulum damper are not effectively utilized.

SUMMARY OF THE INVENTION

The invention provides a control system that is able to improve vibration damping characteristics in a low rotation speed range of an engine and also improve fuel consumption and power performance.

An aspect of the invention provides a control system for a vehicle. In the vehicle, a transmission unit, including a continuously variable transmission that is able to continuously change a speed ratio, is coupled to an engine via a fluid coupling including a lockup clutch, a spring damper is provided between the transmission unit and the lockup clutch, a dynamic damper is provided in the transmission unit, the dynamic damper includes a base portion and a mass body that oscillates with respect to the base portion, the base portion is coupled to the transmission unit such that a moment of inertia of the transmission unit is included in a moment of inertia of the base portion. The control system includes a controller. The controller is configured to control an operating point of the engine, which is determined by an output torque and an output rotation speed. The controller is configured to obtain a speed ratio equivalent value that is determined by a speed ratio set in the transmission unit. The controller is configured to control the engine by setting the operating point of the engine such that the operating point in the case where the lockup clutch is engaged and the speed ratio equivalent value is large is lower in the output rotation speed for a predetermined output torque than the operating point in the case where the lockup clutch is engaged and the speed ratio equivalent value is smaller than the large speed ratio equivalent value.

In the aspect of the invention, the controller may be configured to include at least two operating lines, that is, a first operating line and a second operating line, as operating lines for controlling the operating point of the engine, the second operating line may be lower in the output rotation speed for the predetermined output torque than the first operating line, the controller may be configured to, when the lockup clutch is engaged and the speed ratio equivalent value exceeds a predetermined value, operate the engine at an operating point on the second operating line, and the controller may be configured to, when the lockup clutch is engaged and the speed ratio equivalent value is smaller than or equal to the predetermined value, operate the engine at an operating point on the first operating line.

In the aspect of the invention, each of the first operating line and the second operating line may be composed of an optimal fuel consumption line that connects predetermined optimal fuel consumption operating points, and a low torque operating line that is continuous with the optimal fuel consumption line at a low output rotation speed side and that connects operating points that are lower in output torque than the operating points on the optimal fuel consumption line, and the low torque operating line of the second operating line may be lower in the output rotation speed for the predetermined output torque than the low torque operating line of the first operating line.

In the aspect of the invention, each of the first operating line and the second operating line may be composed of a high torque operating line set on a higher output torque side than an optimal fuel consumption line that connects predetermined optimal fuel consumption operating points, and a low torque operating line that is continuous with the high torque operating line at a low output rotation speed side and that connects operating points that are lower in output torque than the operating points on the high torque operating line, and the low torque operating line of the second operating line may be lower in the output rotation speed for the predetermined output torque than the low torque operating line of the first operating line.

In the aspect of the invention, a minimum output rotation speed of the second operating line may be lower than a minimum output rotation speed of the first operating line.

In the aspect of the invention, a minimum output rotation speed of the second operating line may be equal to a minimum output rotation speed of the first operating line, and the output torque of an operating point at the minimum output rotation speed of the second operating line may be larger than the output torque of an operating point at the minimum output rotation speed of the first operating line.

In the aspect of the invention, the controller may be configured to, in a state where the lockup clutch is released, set a rotation speed lower than a minimum rotation speed of the engine, which is settable in a state where the lockup clutch is engaged.

In the aspect of the invention, the dynamic damper may be any one of a pendulum damper in which a pendulum that serves as the mass body is coupled to the base portion, a damper in which the mass body is coupled to the base portion via a spring, and a damper in which the engine is coupled to any one of three rotating elements in a differential mechanism that performs differential action with the use of the three rotating elements, the spring damper is coupled to another one of the rotating elements and the mass body is coupled to the other one of the rotating elements.

According to the aspect of the invention, when the speed ratio equivalent value is large because of, for example, the reason why the speed ratio set in the transmission unit is large in a state where the lockup clutch is engaged, the engine is operated at a low rotation speed side as compared to when the speed ratio equivalent value is small. In this case, the speed ratio equivalent value is large and the vibration damping performance of the dynamic damper is improved by the addition of the moment of inertia of the transmission unit to the moment of inertia of the base portion of the dynamic damper as compared to when the speed ratio equivalent value is small. Therefore, even when the operating point of the engine in a state where the lockup clutch is engaged is set to a low rotation speed, it is possible to prevent or suppress deterioration of vibration or noise. In other words, it is possible to expand the operating range of a so-called lockup on state to a low rotation speed side or low vehicle speed side.

Particularly, when the operating line is composed of the optimal fuel consumption line and the low torque operating line in which operating points lower in torque than the operating points on the optimal fuel consumption line are set at a low rotation speed side, and when the speed ratio equivalent value is large, it is possible to increase the opportunity of operating the engine at an operating point on the optimal fuel consumption line.

In the aspect of the invention, in a drive mode in which a large driving force is required, the engine is operated at an operating point on the high torque operating line that is set on a higher torque side than the operating points on the optimal fuel consumption line. In this case as well, when the speed ratio equivalent value at the time when the output torque has decreased to the predetermined torque is large in a state where the lockup clutch is engaged, the engine is operated at an operating point on the low torque operating line that is continuous with the high torque operating line at a low rotation speed side. As a result, it is possible to keep the lockup on state to a low rotation speed range without deteriorating vibration or noise.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 2 is a partially cross-sectional view that shows an example of the configuration of a damper mechanism;

DETAILED DESCRIPTION OF EMBODIMENTS

Figure 1:
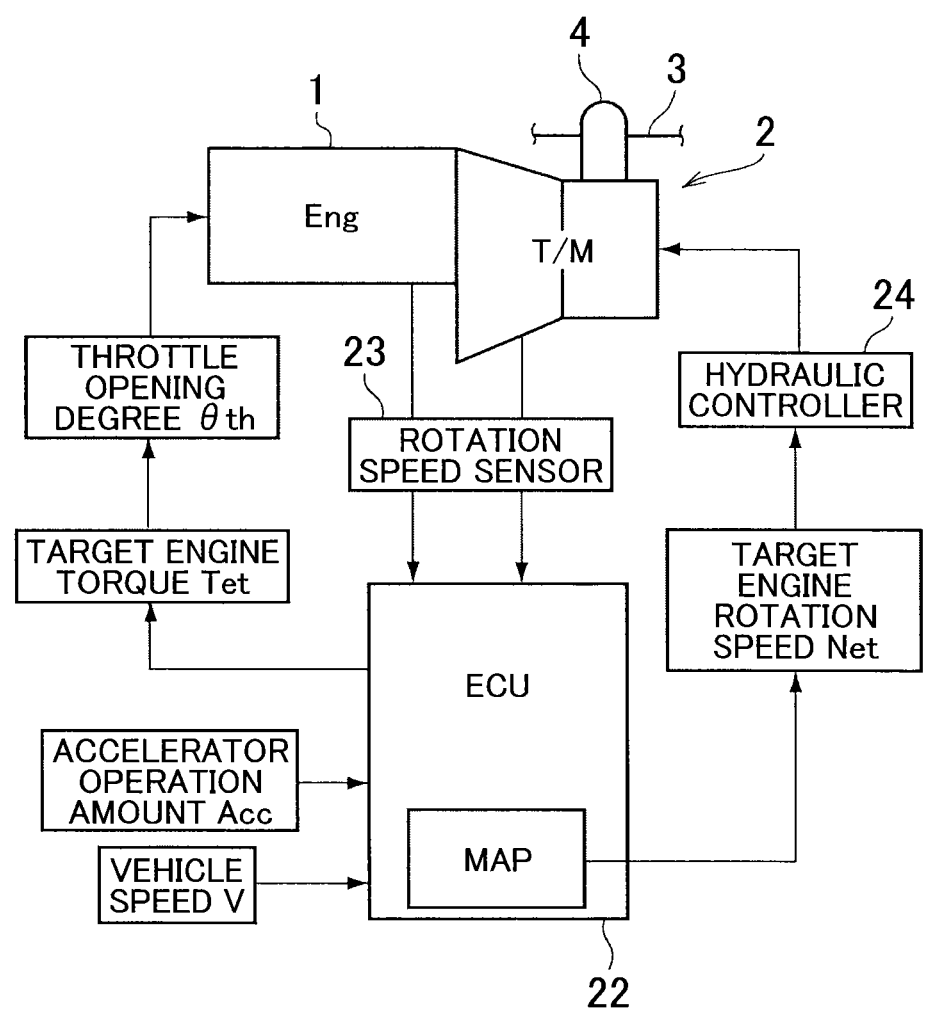
FIG. 1 is a block diagram that shows a drive line and control system of a vehicle to which the invention is applicable.

FIG. 1 shows a block diagram of a drive line and control system of a vehicle to which the invention is applicable. A transmission (T/M) 2 is coupled to the output side of an engine (Eng) 1. Driving force is output from the transmission 2 to drive wheels (not shown) via drive shafts (D/S) 3. The engine 1 is an internal combustion engine, and outputs power by the use of repeated combustion of fuel. Therefore, output torque inevitably vibrates. The vibration is easy to be experienced at a predetermined low frequency and causes deterioration of a ride comfort of the vehicle, so a minimum (lower limit) rotation speed is set. The engine 1 includes a throttle valve (not shown). Output power increases as a throttle opening degree increases. An operating point of the engine 1 is represented by an output torque and an output rotation speed. There are operating points at which a fuel consumption rate (fuel consumption) is low. In a map (operating line map) that uses output torque and output rotation speed as parameters, a line that connects the operating points at which fuel consumption is low is obtained as an optimal fuel consumption line in advance, and, at the time of steady traveling, the output rotation speed and the output torque are controlled such that the operating state of the engine 1 coincides with the operating point on the optimal fuel consumption line as much as possible.

The transmission 2 includes a continuously variable transmission mechanism that is able to continuously change a speed ratio. The transmission 2 may be configured as a transaxle including a differential 4 that distributes power to the right and left drive shafts 3. In addition, the transmission 2 includes a damper mechanism 5 (see FIG. 2) (described later) for reducing torsional vibration. The damper mechanism 5 includes a spring damper 6 and a dynamic damper 7. The spring damper 6 damps vibration with the use of a spring. The dynamic damper 7 utilizes the oscillation of a mass body. FIG. 2 shows an example of the damper mechanism 5.

FIG. 2 shows a torque converter 9 including a lockup clutch 8. The torque converter 9 corresponds to a fluid coupling in the embodiment of the invention. The lockup clutch 8 is arranged so as to face the inner side face of a front cover 10 coupled to the engine 1. The lockup clutch 8, as well as a generally known lockup clutch, is a disc-shaped member, and is fitted to the outer peripheral portion of an input shaft 11 or the outer peripheral portion of a member integrated with the input shaft 11 so as to be rotatable and movable back and forth in an axial direction. The spring damper 6 is arranged on the back face side (side across from the front cover 10) of the lockup clutch 8. The spring damper 6 has a similar structure to that of a generally known lockup damper. That is, the spring damper 6 includes a drive plate 12, a driven plate 13 and springs 14. The drive plate 12 rotates integrally with the lockup clutch 8. The driven plate 13 is arranged so as to face the drive plate 12 and is relatively rotatable with respect to the drive plate 12. The springs 14 are arranged inside window holes provided in these plates 12, 13, and are compressed when the plates 12, 13 relatively rotate.

A turbine runner 15 is arranged along the same axis as the spring damper 6. The dynamic damper 7 is arranged between the spring damper 6 and the turbine runner 15. In the example shown in FIG. 2, the dynamic damper 7 is a pendulum damper. Pendulums (or rolling elements) 16 that are mass bodies are supported by a rotating body 17 that is integrated with the input shaft 11 in a rotation direction. The rotating body 17 corresponds to a base portion in the embodiment of the invention. The pendulums 16 are supported by the rotating body 17 so as to oscillate with respect to the rotating body 17 when the rotation speed of the rotating body 17 has changed as a result of a torque fluctuation.

An example of a mode in which the pendulums 16 are supported will be described. The rotating body 17 has a plurality of rolling chambers 18. The plurality of rolling chambers 18 are hermetically sealed in a liquid-tight manner, and are provided at set intervals in the rotation direction of the rotating body 17. The circular pendulum 16 is arranged in each of the rolling chambers 18. Within the inner face of each rolling chamber 18, an outer face in the radial direction of the rotating body 17 is used as a rolling contact surface. The rolling contact surface is a face against which the corresponding pendulum 16 is pressed by centrifugal force when the rotating body 17 rotates at a rotation speed higher than or equal to a predetermined rotation speed. The rolling contact surface is configured to guide the corresponding pendulum 16 such that the corresponding pendulum 16 performs pendular movement about a predetermined pendulous axis. As for a specific example, the rolling contact surface is a circular arc surface about a position spaced in the radial direction from the center of the rotating body 17. The square root of the ratio of a distance from the rotation center of the rotating body 17 to the above-described pendulous axis to a distance from the pendulous axis to the center of gravity of the corresponding pendulum 16 corresponds to the vibration degree of torsional vibration of the rotating body 17.

The driven plate 13 in the above-described spring damper 6 is coupled to the rotating body 17. A turbine hub 19 is provided on the input shaft 11. The turbine runner 15 is coupled to the turbine hub 19. A pump impeller (not shown) is arranged so as to face the turbine runner 15. The above-described front cover 10 is coupled to the pump impeller. The input shaft 11 is coupled to a transmission unit 20. The transmission unit 20 is a portion mainly formed of the above-described continuously variable transmission.

Figure 3:
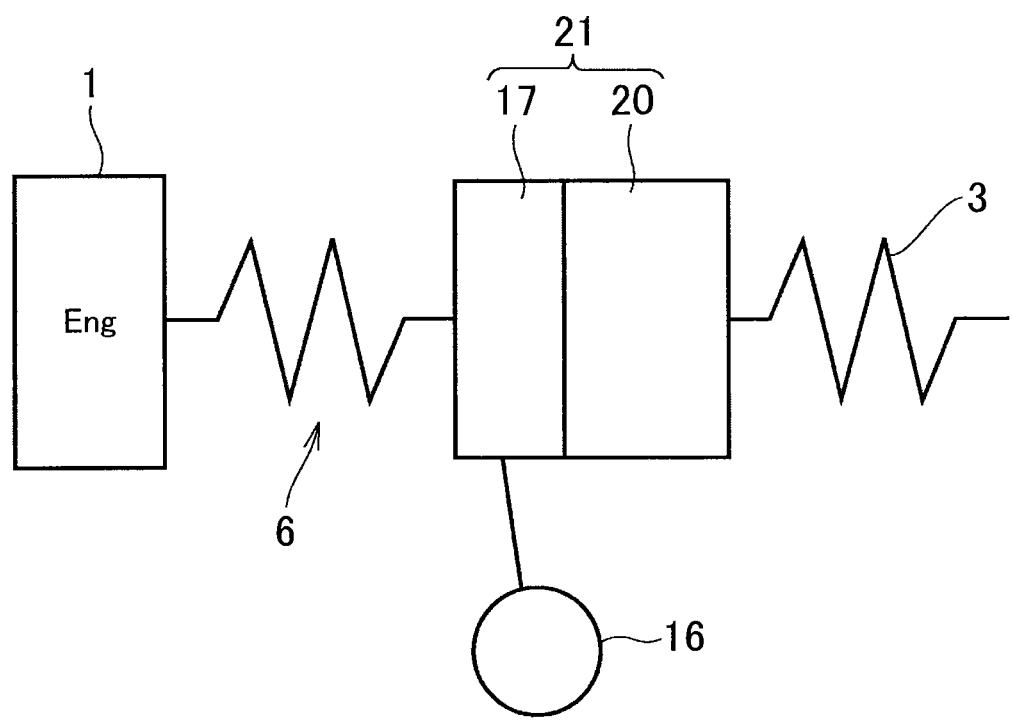
FIG. 3 is a block diagram in which the drive line is rewritten as a vibration system.
Figure 4:
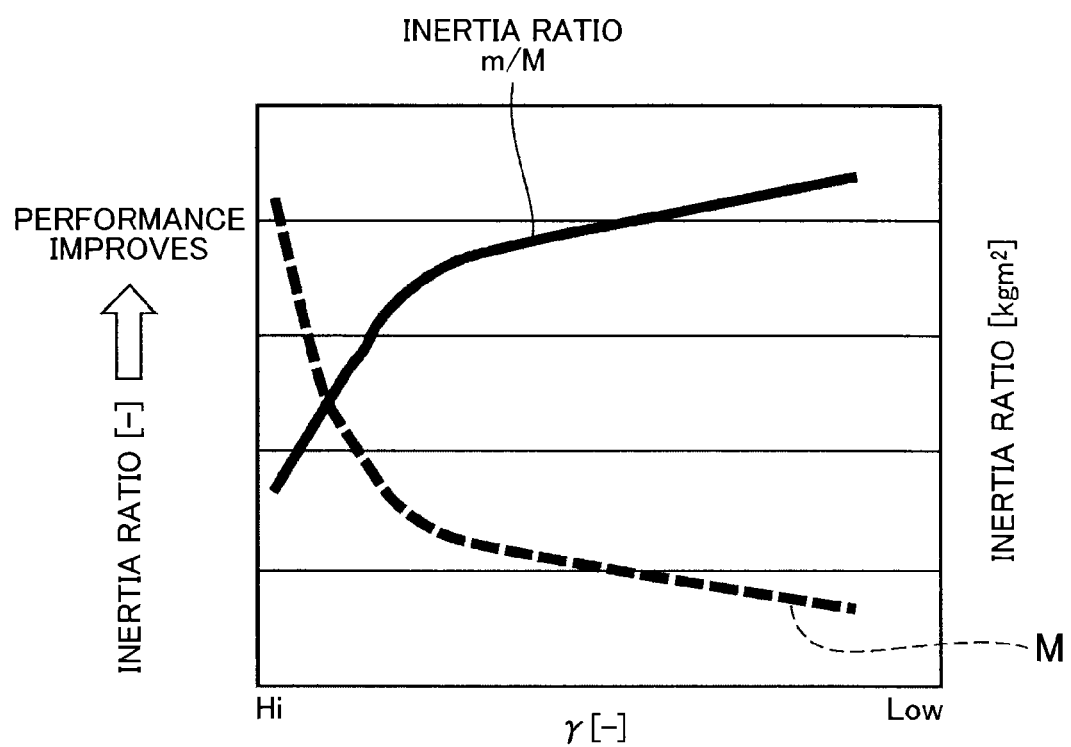
FIG. 4 is a graph that shows the relationship between a speed ratio and an inertia ratio.

Therefore, in the above-described vehicle that is a subject of the embodiment of the invention, the spring damper 6 is interposed between the engine 1 and the dynamic damper 7; whereas a power transmission path from the dynamic damper 7 to the drive shafts 3 is formed of members, such as a rotary shaft, a gear and the transmission unit 20, that may be substantially regarded as rigid bodies as compared to the spring damper 6. Therefore, where a power transmission path from the engine 1 to the drive shafts 3 is viewed as an elastic system, the rotating body 17 in the above-described dynamic damper 7, and the turbine runner 15, the input shaft 11, the transmission unit 20, and the like, connected to the rotating body 17 may be treated as a single inertial body 21 as shown in FIG. 3. The inertial body 21 has a center of gravity at a portion spaced apart from a main vibration system, and includes a member of which the rotation speed changes in response to a speed ratio. Therefore, an equivalent moment of inertia M of the inertial body 21 changes in response to a speed ratio γ that is set in the transmission unit 20. Specifically, the equivalent moment of inertia M reduces as the speed ratio γ increases (becomes lower). The tendency of the change is shown by the graph in FIG. 7. The ratio (m/M) of moments of inertia m of the pendulums 16 to the equivalent moment of inertia M is called inertia ratio. The inertia ratio increases as the speed ratio γ increases as shown together in FIG. 4.

Figure 5:
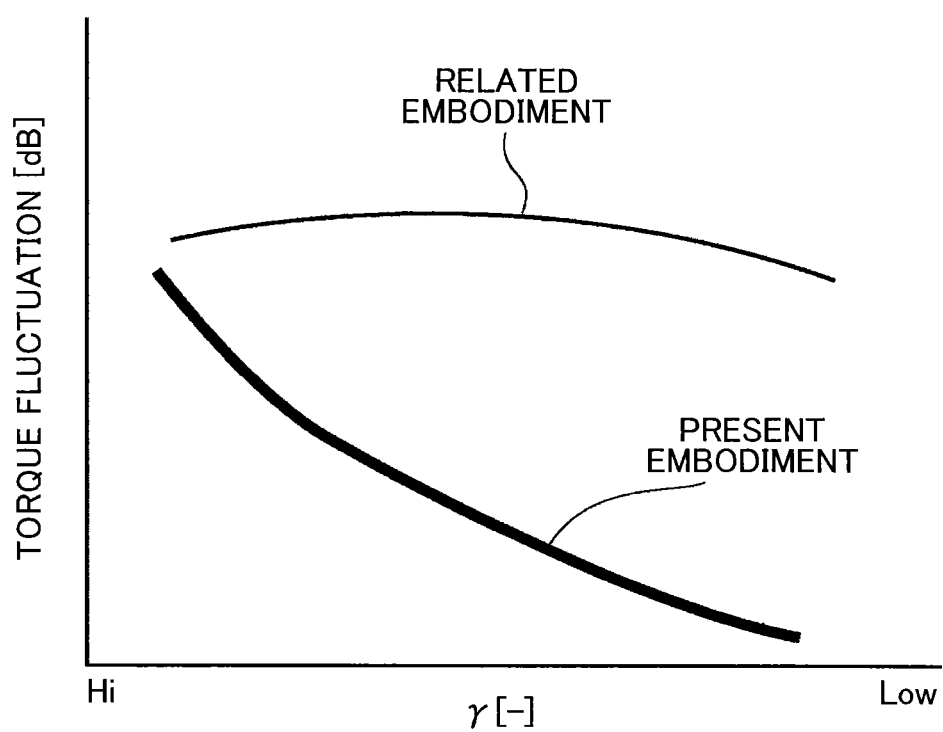
FIG. 5 is a graph that shows the relationship between a speed ratio and a torque fluctuation (vibration damping performance)

The inertia ratio (m/M) in the dynamic damper 7, such as the pendulum damper, is a parameter that significantly relates to the vibration damping performance of the dynamic damper 7. The vibration damping performance improves as the inertia ratio (m/M) increases. That is, as the speed ratio γ increases, a torque fluctuation amount (dB) reduces. This is shown by the graph in FIG. 5. FIG. 5 shows a torque fluctuation amount (dB) in a vibration system (related embodiment) in which a dynamic damper and a transmission unit respectively constitute separate inertial bodies, for example, a spring damper is interposed between the dynamic damper and the transmission unit, by the narrow continuous line.

Figure 6:
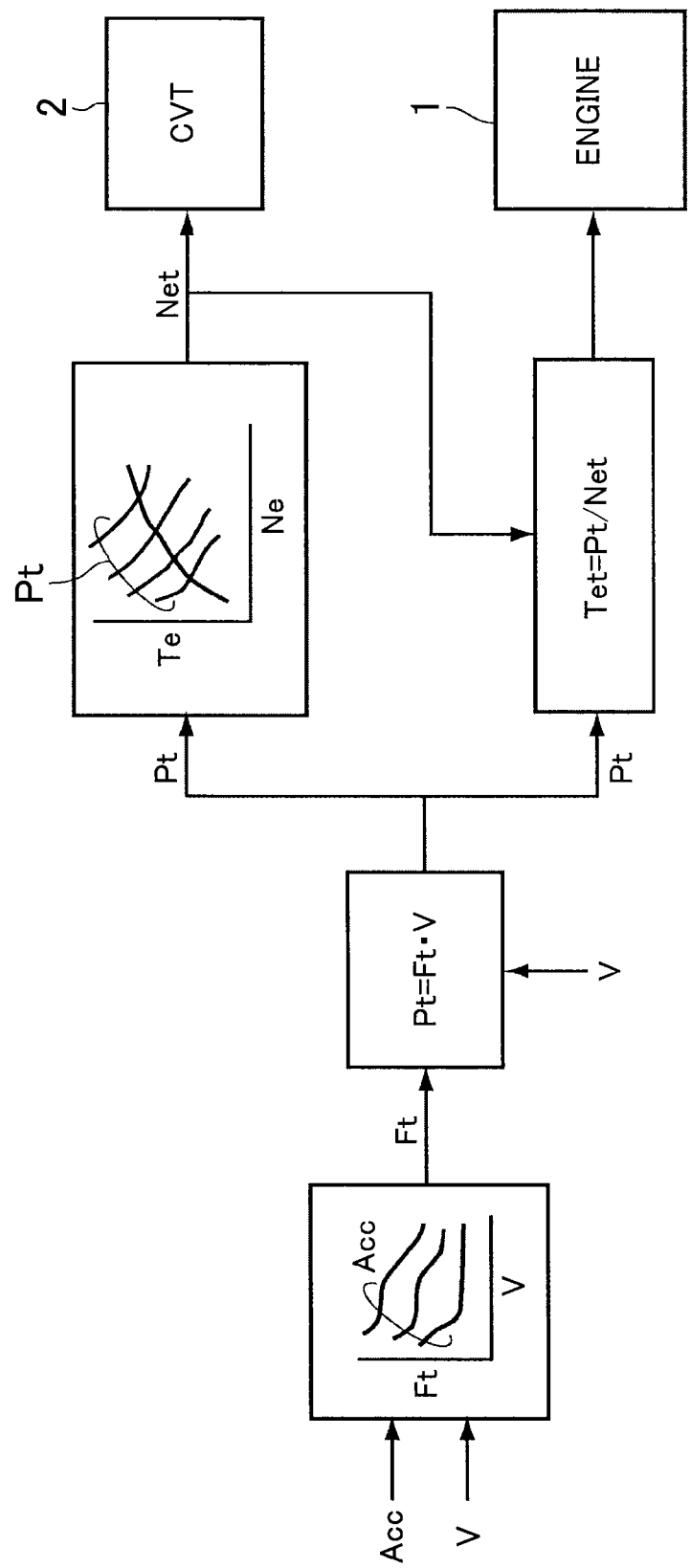
FIG. 6 is a block diagram for illustrating engine rotation speed control and engine torque control in a vehicle including a CVT.

The transmission unit 20 may be formed of a belt-type continuously variable transmission mechanism. Control over the speed ratio, as well as shift control in an existing automatic transmission, is executed on the basis of a required driving amount, typically, an accelerator operation amount, and a vehicle speed, typically, an output rotation speed of the transmission unit 20. An engine rotation speed and an output torque are controlled in parallel with each other on the basis of the required driving amount and the output rotation speed. FIG. 6 is a block diagram for illustrating the procedure of the control. A required driving force Ft is obtained on the basis of the accelerator operation amount Acc and the vehicle speed V. A driving force that is generated by the vehicle determines the characteristics or performance of the vehicle, so the required driving force Ft based on the accelerator operation amount Acc and the vehicle speed V may be determined in advance by design. A target power Pt is obtained on the basis of the required driving force Ft and the vehicle speed V. Optimal fuel consumption operating points of the engine 1 are obtained by an experiment, or the like, the optimal fuel consumption operating points are plotted on a map that uses an engine torque Te and an engine rotation speed Ne as variables, and a line that connects the optimal fuel consumption operating points is an optimal fuel consumption line. An intersection of a constant power line with the optimal fuel consumption line on the map is an operating point at which it is possible to output the target power Pt at an optimal fuel consumption. The engine rotation speed at that operating point is obtained as a target engine rotation speed Net. In a vehicle on which a continuously variable transmission (CVT) is mounted, the CVT is controlled such that an actual engine rotation speed coincides with the target engine rotation speed Net. The ratio of the thus controlled engine rotation speed to the output rotation speed of the transmission 2 is the speed ratio γ. In other words, in an ordinary traveling state, a control target is the engine rotation speed, and the speed ratio γ is a value that is computed as a result of the control. On the other hand, the target engine torque Tet is obtained by dividing the target power Pt by the target engine rotation speed Net. The throttle opening degree or fuel injection amount of the engine 1 is controlled such that the target engine torque Tet is output.

An electronic control unit (ECU) 22 for executing the above-described engine control and transmission control is provided (see FIG. 1). The ECU 22 corresponds to a controller in the embodiment of the invention, and is mainly formed of a microcomputer. The ECU 22 is configured to use input data and prestored data to perform computation in accordance with a predetermined program, and output the computed result as a control command signal. Data that are input from the outside are the accelerator operation amount Acc, the vehicle speed V, detected values of a rotation speed sensor 23, and the like. The rotation speed sensor 23 detects various rotation speeds, such as the engine rotation speed and the turbine rotation speed. An example of the prestored data is a map for obtaining the above-described optimal fuel consumption operating point. A command signal is output to a hydraulic controller 24 such that the target engine rotation speed Net calculated in the ECU 22 is achieved, and the transmission 2 is controlled. Therefore, the speed ratio in the transmission 2 changes. On the other hand, the throttle opening degree θth is controlled such that the target engine torque Tet is achieved.

Figure 7:
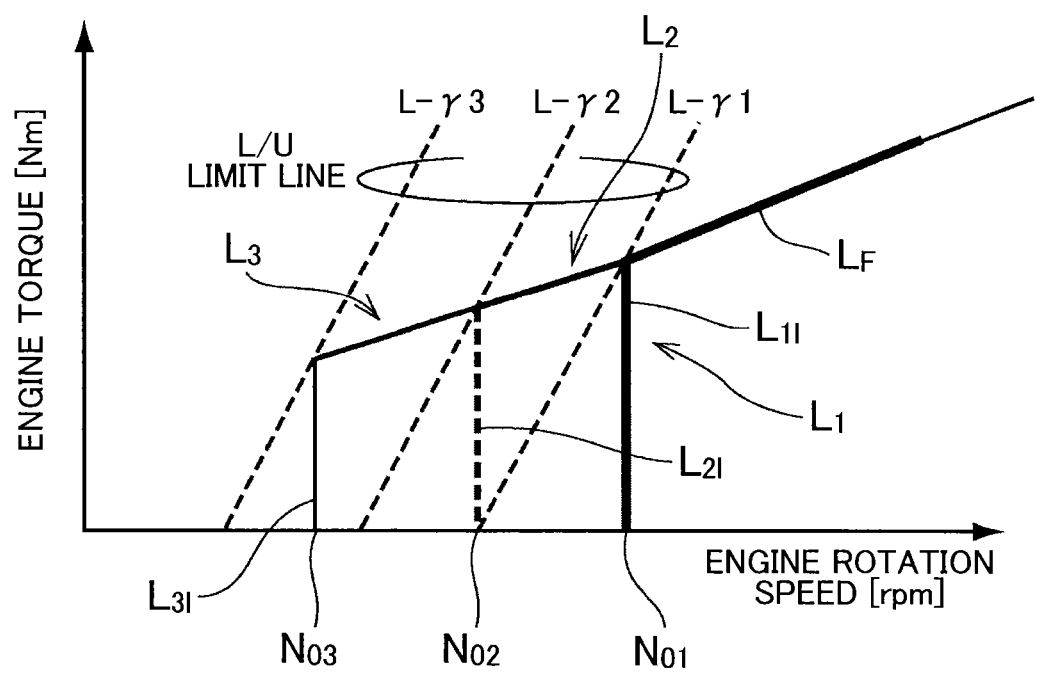
FIG. 7 is a graph that schematically shows an example of operating lines that are used in the embodiment of the invention.

When the engine 1 is operated at a low rotation speed and a low load, the vibration and noise of the vehicle deteriorate. Particularly, in a state where the above-described lockup clutch 8 is engaged (lockup on state), torque is transmitted from the engine 1 to the drive wheels by a mechanical means, such as a clutch and a gear, and no fluid, such as fluid in the torque converter 9, is interposed, so a fluctuation in the output torque of the engine 1 is easily transmitted to a vehicle body, and the vibration and noise of the vehicle body easily deteriorate. For the purpose of improving such vibration and noise, the minimum rotation speed during operation is set as described above. When an example of setting of the minimum rotation speed is shown together in the above-described map (operating line map) for engine control, the example is as shown in FIG. 7. In the vehicle that has the above-described configuration and to which the invention is applied, the vibration damping performance of the dynamic damper 7 changes depending on the speed ratio γ, the rotation speed based on the speed ratio γ, and the like. Therefore, in terms of NV characteristics, an allowable minimum rotation speed varies depending on the speed ratio γ and the rotation speed based on the speed ratio γ (hereinafter, the value of the speed ratio γ or the rotation speed or rotation speed ratio that is determined by the speed ratio γ is referred to as speed ratio equivalent value). For example, as the speed ratio equivalent value increases, the minimum rotation speed of the engine 1 in the so-called lockup on state where the lockup clutch 8 is engaged is allowed to be set to a low rotation speed side.

The minimum rotation speed of the engine 1 is determined by design such that the vibration and noise (that is, the NV characteristics) of the vehicle do not deteriorate. The vibration and noise are damped by the above-described dynamic damper 7, spring damper 6, and the like. The vibration damping performance of the damper mechanism 5 changes in response to the speed ratio γ. That is, because the vibration damping performance improves as the speed ratio equivalent value increases, a lockup limit value that is the lower limit value of the allowable engine rotation speed in terms of the NV characteristics is set in response to the speed ratio γ or the speed ratio equivalent value. In the example shown in FIG. 7, the lockup limit value is determined in response to first to third speed ratios γ1, γ2, γ3 (γ1<γ2<γ3). The speed ratios γ1, γ2, γ3 may be determined by design as needed so as to have predetermined deviations from each other. The speed ratios γ1, γ2, γ3 are values in such a range that the values are settable in the transmission 2, the NV characteristics of the vehicle fall within an allowable limit and traveling is maintained without, for example, engine stall. Each of these speed ratios γ1, γ2, γ3 corresponds to a predetermined value in the embodiment of the invention.

The lockup limit values for the speed ratios γ1, γ2, γ3 are respectively indicated by lockup limit lines L-γ1, L-γ2, L-γ3 in FIG. 7. The engine rotation speeds at the intersections of these lockup limit lines L-γ1, L-γ2, L-γ3 with an optimal fuel consumption line LF are respectively minimum rotation speeds No1, No2, No3 in the lockup on state for the speed ratios γ1, γ2, γ3. That is, in a state where the lockup clutch 8 is engaged, when the operating point of the engine 1 is lower in torque than the operating points on the optimal fuel consumption line, the engine rotation speed is kept at the first minimum rotation speed No1 when the speed ratio γ is the predetermined first speed ratio γ1, and, similarly, the engine rotation speed is kept at the second minimum rotation speed No2 when the speed ratio γ is the predetermined second speed ratio γ2, and the engine rotation speed is kept at the third minimum rotation speed No3 when the speed ratio γ is the predetermined third speed ratio γ3. Lines L1*l*, L2*l*, L3*l* that respectively indicate these minimum rotation speeds No1, No2, No3 (each of the lines corresponds to a low torque operating line in the embodiment of the invention) are lower in torque than the operating points on the optimal fuel consumption line LF, each connect the operating points of a corresponding one of the minimum rotation speeds No1, No2, No3, and are continuous with the optimal fuel consumption line LF at the operating points of the corresponding minimum rotation speeds No1, No2, No3. Hereinafter, the line L1*l* and the optimal fuel consumption line LF continuous with the line L1*l* are temporarily referred to as first operating line L1. Similarly, the line L2*l* and the optimal fuel consumption line LF continuous with the line L2*l* are temporarily referred to as second operating line L2. The line L3*l* and the optimal fuel consumption line LF continuous with the line L3*l* are temporarily referred to as third operating line L3. The operating lines L1, L2, L3 indicate the operating points of the engine 1 in the lockup on state. Therefore, in a lockup off state where the lockup clutch 8 is released, the engine rotation speed is controlled to a rotation speed lower than or equal to a corresponding one of the minimum rotation speeds No1, No2, No3.

Three operating lines are shown in FIG. 7; however, in the embodiment of the invention, two operating lines may be set or a further larger number of operating lines may be set. For example, further larger speed ratios and minimum rotation speeds corresponding to the speed ratios may be set. Alternatively, the interval between the first speed ratio γ1 and the third speed ratio γ3 may be further divided, and a further larger number of speed ratios and minimum rotation speeds corresponding to the speed ratios may be set. The first to third speed ratios γ1 to γ3 may be set by design as needed in consideration of not only the NV characteristics but also fuel consumption, the frequency of shifting of operating lines, or the like.

Figure 8:
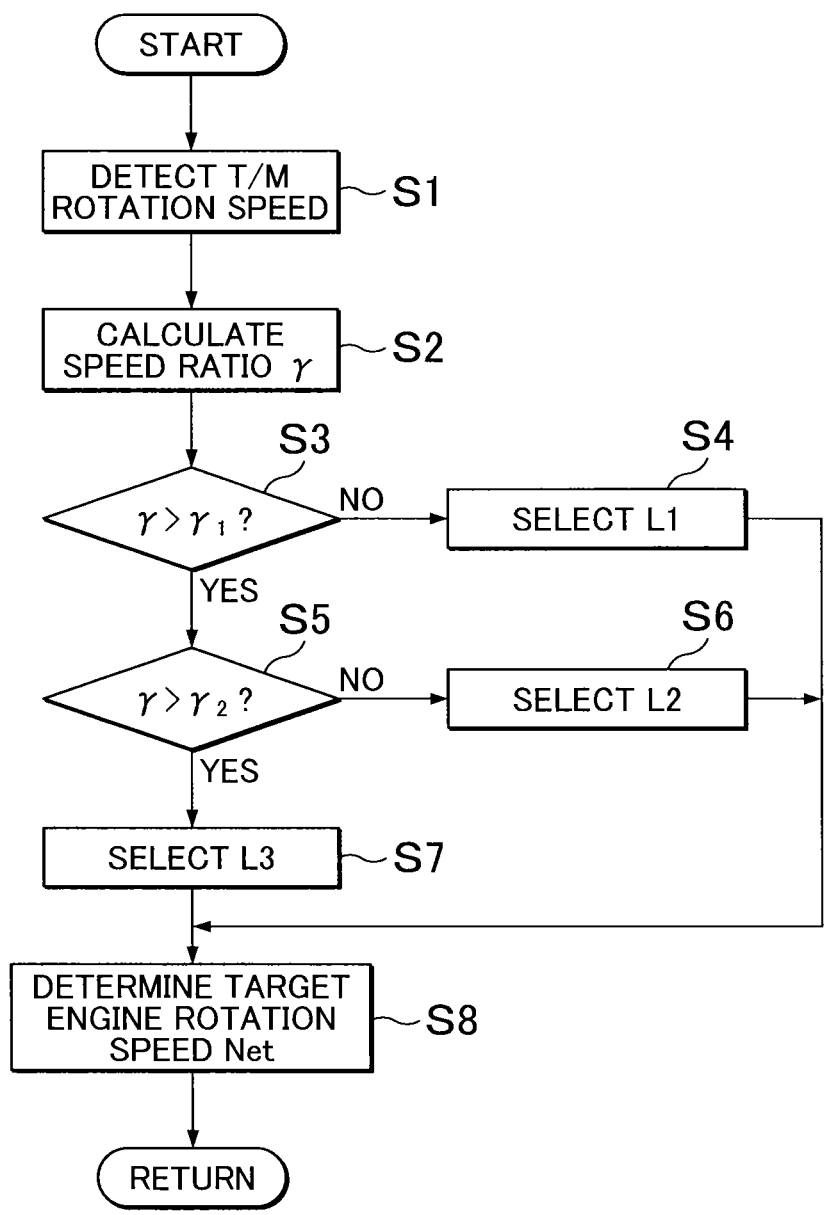
FIG. 8 is a flowchart for illustrating an example of control that is executed in a control system according to the embodiment of the invention.

The above-described ECU 22 has the map including these operating lines L1 to L3. A control system in the embodiment of the invention includes the ECU 22, and is configured to set the target engine rotation speed Net on the basis of the map. A control example of the control system is shown in the flowchart of FIG. 8. The routine shown in FIG. 8 is repeatedly executed at predetermined short time intervals after the vehicle starts moving or while the vehicle is traveling. In a vehicle on which a continuously variable transmission is mounted, the continuously variable transmission is controlled such that an engine rotation speed becomes a target rotation speed, and a speed ratio becomes a predetermined value as a result of the control. The speed ratio is not set as a direct control target or controlled object. Initially, in a state where the lockup clutch 8 is engaged, a predetermined rotation speed in the transmission 2 is detected (step S1). When the transmission unit 20 is formed of a belt-type CVT, the rotation speed of a drive-side primary pulley (not shown) and the rotation speed of a driven-side secondary pulley (not shown) are detected by the above-described rotation speed sensor 23. The speed ratio γ that is the ratio of those rotation speeds is calculated (step S2).

It is determined whether the calculated speed ratio γ is larger than the above-described first speed ratio γ1 (step S3). When negative determination is made in step S3 as a result of the fact that the calculated speed ratio γ is smaller than or equal to the first speed ratio γ1, the above-described first operating line L1 is selected as the operating line for determining the operating point of the engine 1 (step S4).

On the contrary, when affirmative determination is made in step S3, it is determined whether the calculated speed ratio γ is larger than the above-described second speed ratio γ2 (step S5). When negative determination is made in step S5 as a result of the fact that the calculated speed ratio γ is smaller than or equal to the second speed ratio γ2, the above-described second operating line L2 is selected as the operating line for determining the operating point of the engine 1 (step S6).

When affirmative determination is made in step S3, the above-described third operating line L3 is selected as the operating line for determining the operating point of the engine 1 (step S7). After the operating line is selected in any one of these step S4, step S6 and step S7, the target engine rotation speed Net is obtained on the basis of the selected operating line, the accelerator operation amount, the vehicle speed, and the like (step S8). Therefore, the ECU 22 corresponding to the controller in the embodiment of the invention obtains the speed ratio or the speed ratio equivalent value as in the case of the control in step S2, and then operates the engine 1 at the operating point at which the engine rotation speed in the lockup on state in the case where the speed ratio or the speed ratio equivalent value is large is lower than the engine rotation speed in the lockup on state in the case where the speed ratio or the speed ratio equivalent value is small.

As described above, the number of operating lines and the number of speed ratios as a threshold for selecting one of the operating lines are not limited to three as shown in FIG. 8 or FIG. 7. The control routine shown in FIG. 8 is described on the assumption that n operating lines and n speed ratios as a threshold for selecting one of the n operating lines are set. Initially, the detected speed ratio γ is compared with the speed ratio as the smallest threshold, and, when the detected speed ratio γ is larger than the threshold, the detected speed ratio γ is compared with the second smallest threshold as in the case of the example shown in FIG. 8. Similarly, the detected speed ratio γ is compared with the (n-1)th smallest threshold (that is, the second largest threshold), and, when the detected speed ratio γ is larger than the speed ratio as the second largest threshold, the nth operating line Ln is selected. In process of comparing the detected speed ratio γ sequentially with the first threshold to the (n-1)th threshold, when it is determined that the detected speed ratio γ is smaller than or equal to any one of the thresholds, the operating line corresponding to the threshold by which affirmative determination is made is selected. Comparison of the detected speed ratio γ with a threshold may be carried out in order from a speed ratio as a larger threshold instead of carrying out the comparison in order from a smaller threshold as described above. Determination as to the magnitude relation of the speed ratio γ may be initiated from comparison with the third speed ratio γ3, reverse to the order shown in the flowchart.

Figure 9:
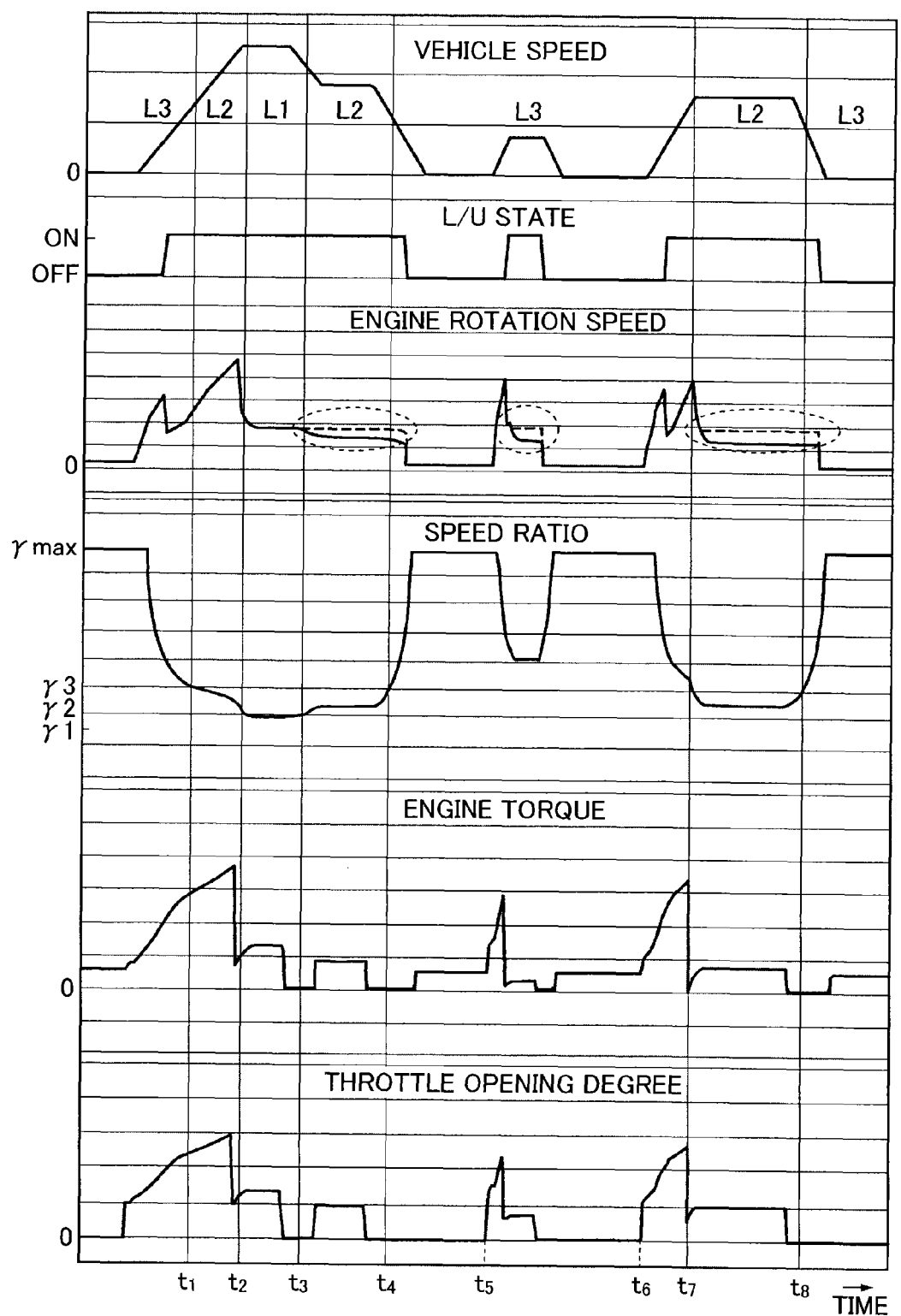
FIG. 9 is a time chart that shows an example of changes in the behavior of the vehicle in the case where the operating lines shown in FIG. 7 are used.

An example of the behavior of the vehicle in the case where any one of the operating lines L1 to L3 is selected and control based on the selected one of the operating lines L1 to L3 is executed will be described with reference to FIG. 9. In the example shown in FIG. 9, the vehicle starts moving, accelerates to a predetermined vehicle speed, keeps the vehicle speed, and decelerates to stop, after that, moves slightly at a low vehicle speed and then stops, furthermore, travels at a vehicle speed lower than the predetermined vehicle speed and then stops. Before the vehicle starts moving, the engine 1 is operating at idle and is outputting a slight torque. In this state, the vehicle speed and the throttle opening degree are zero, the lockup clutch 8 is in the lockup off state (L/U: OFF), and the speed ratio γ is the maximum speed ratio γmax. Therefore, the above-described third operating line L3 is selected as the operating line.

When an accelerator pedal (not shown) is depressed and the throttle opening degree increases, the engine torque and the engine rotation speed gradually increase, and the vehicle starts moving. With an increase in the vehicle speed, the speed ratio γ gradually reduces. In this process, the lockup clutch 8 is switched into the lockup on state (L/U: ON). At this time, the engine rotation speed slightly decreases, and then the engine rotation speed increases again.

When the speed ratio γ reduces with an increase in the vehicle speed and the above-described speed ratio equivalent value becomes smaller than or equal to the above-described third speed ratio γ3, the operating line is shifted to the above-described second operating line L2 (time t1). Because the accelerator pedal is still depressed and the throttle opening degree is large, the vehicle is in an accelerating state, and the engine rotation speed and the vehicle speed further continue increasing. When the accelerator pedal is returned because of the fact that the vehicle speed has reached the predetermined vehicle speed and the vehicle shifts into constant speed traveling, the engine torque and the engine rotation speed decrease, and the speed ratio γ reduces. When the speed ratio γ reaches the above-described second speed ratio γ2 or becomes smaller than or equal to the second speed ratio γ2 (time t2), the operating line is shifted to the above-described first operating line L1. At this time, accelerating force is not particularly required, so the engine 1 is operated at the operating point on the above-described optimal fuel consumption line.

After that, when the throttle opening degree is reduced for deceleration, the operating point of the engine 1 changes along the optimal fuel consumption line toward a low rotation speed and low torque side. The vehicle speed gradually decreases. In this process, when the speed ratio $\gamma$ becomes larger than the above-described second speed ratio $\gamma 2$, the operating line is shifted to the second operating line L2 (time t3). After that, the throttle opening degree is kept at a predetermined opening degree such that the vehicle speed is kept. In the state where the vehicle speed is kept in this way, the engine 1 is operated along the optimal fuel consumption line. The second operating line L2 in this case is able to set the engine rotation speed to a lower rotation speed than the first operating line L1, so the engine rotation speed decreases in response to a shift of the operating line. That is, the engine 1 is operated at a lower rotation speed-side operating point on the optimal fuel consumption line. In this case, if the engine 1 is operated at the operating point on the first operating line L1 without shifting the operating line, the engine rotation speed increases and the operating point falls outside the optimal fuel consumption line, so fuel consumption deteriorates. In other words, as a result of the fact that the operating line is shifted as described above in response to the speed ratio $\gamma$, fuel consumption improves. The region in which fuel consumption improves is surrounded by the dashed line in FIG. 9.

When the throttle opening degree is reduced toward zero from the state where the vehicle speed is kept, the vehicle speed decreases, and the speed ratio $\gamma$ gradually increases toward the maximum speed ratio $\gamma$max that is the speed ratio during a stop of the vehicle. In this process, when the speed ratio $\gamma$ exceeds the above-described third speed ratio $\gamma 3$, the operating line is shifted to the above-described third operating line L3 (time t4). When the engine rotation speed becomes lower than a predetermined lockup lower limit rotation speed, the lockup clutch 8 is released. Therefore, the engine 1 is operated at a lower rotation speed when the lockup clutch 8 is released than when the lockup clutch 8 is engaged.

After the vehicle is stopped, when the accelerator pedal is depressed to cause the vehicle to move slightly forward (time t5), the engine torque, the engine rotation speed and the vehicle speed increase. The accelerator pedal is returned because of the fact that the vehicle speed is close to a vehicle speed intended by a driver, the throttle opening degree is reduced and is set to an opening degree at which the intended low vehicle speed is kept. In this case, because the above-described third operating line L3 is employed, the operating point of the engine 1 becomes the operating point on the optimal fuel consumption line of the third operating line L3. The lockup clutch 8 is engaged. Therefore, the engine rotation speed becomes a low rotation speed indicated by the continuous line in FIG. 9, and fuel consumption improves. For comparison, the case where a spring (not shown) is provided between the dynamic damper 7 and the transmission unit 20 and the transmission unit 20 is caused not to function as the inertial mass of the dynamic damper 7 will be described. In this case, the above-described first operating line L1 is employed, and the engine rotation speed is indicated by the dashed line in FIG. 9. As is apparent from the comparison between the engine rotation speed indicated by the continuous line and the engine rotation speed indicated by the dashed line, the engine rotation speed is decreased by employing the third operating line L3, so fuel consumption is improved. The region in which fuel consumption improves is surrounded by the dashed line in FIG. 9. Although the lockup clutch 8 is engaged, the vibration damping performance of the damper mechanism 5 is improved because of the fact that the speed ratio $\gamma$ is large, so the NV characteristics of the vehicle do not particularly deteriorate.

After the throttle opening degree is reduced to zero and the vehicle is stopped, when the accelerator pedal is depressed to cause the vehicle to start moving again and the throttle opening degree increases (time t6), as described above in the case where the vehicle starts moving, the engine torque, the engine rotation speed and the vehicle speed gradually increase, and the speed ratio $\gamma$ gradually reduces from the maximum speed ratio $\gamma$max. The lockup clutch 8, which has been released during a stop of the vehicle, is engaged in this process, the engine rotation speed temporarily decreases accordingly, and then the engine rotation speed gradually increases.

When the throttle opening degree is reduced in order to keep the vehicle speed at the intended vehicle speed (time t7), the target power of the engine 1, which is obtained on the basis of the accelerator operation amount, decreases, and the speed ratio $\gamma$ reduces accordingly. When the speed ratio $\gamma$ becomes smaller than the above-described third speed ratio $\gamma 3$, the operating line for controlling the engine 1 is shifted from the third operating line L3 to the second operating line L2. That is, it is possible to set the operating point at a lower engine rotation speed on the optimal fuel consumption line. Therefore, in this case as well, it is possible to improve fuel consumption by setting the engine rotation speed to a rotation speed lower than the rotation speed (rotation speed indicated by the dashed line in FIG. 9) in the case where the engine 1 is controlled by using the above-described first operating line L1. Because the lockup clutch 8 is engaged, it is possible to improve fuel consumption by suppressing a power loss. Because the vibration damping performance of the damper mechanism 5 is improved by the increased speed ratio $\gamma$, the NV characteristics of the vehicle do not deteriorate. The region in which fuel consumption improves is surrounded by the dashed line in FIG. 9. When the throttle opening degree is reduced to zero in order to stop the vehicle, the engine torque and the engine rotation speed decrease, and the vehicle speed decreases, as in the case of the above-described stop of the vehicle. The speed ratio $\gamma$ increases toward the maximum speed ratio $\gamma$max. In this process, the third operating line L3 is selected (time t8), and the lockup clutch 8 is released.

As described above, with the control system according to the embodiment of the invention, the low rotation speed-side operating point that does not deteriorate the NV characteristics is set by utilizing the fact that the vibration damping performance of the damper mechanism 5 improves in response to an increase in the speed ratio $\gamma$ that is set in the transmission unit 20. The operating point is selected in response to the speed ratio $\gamma$ that is set in the transmission unit 20 at the time when the vehicle is traveling. As a result, with the control system according to the embodiment of the invention, it is possible to operate the engine at the low rotation speed-side operating point that is not set conventionally in the lockup on state without deteriorating vibration, noise or ride comfort.

Figure 10:
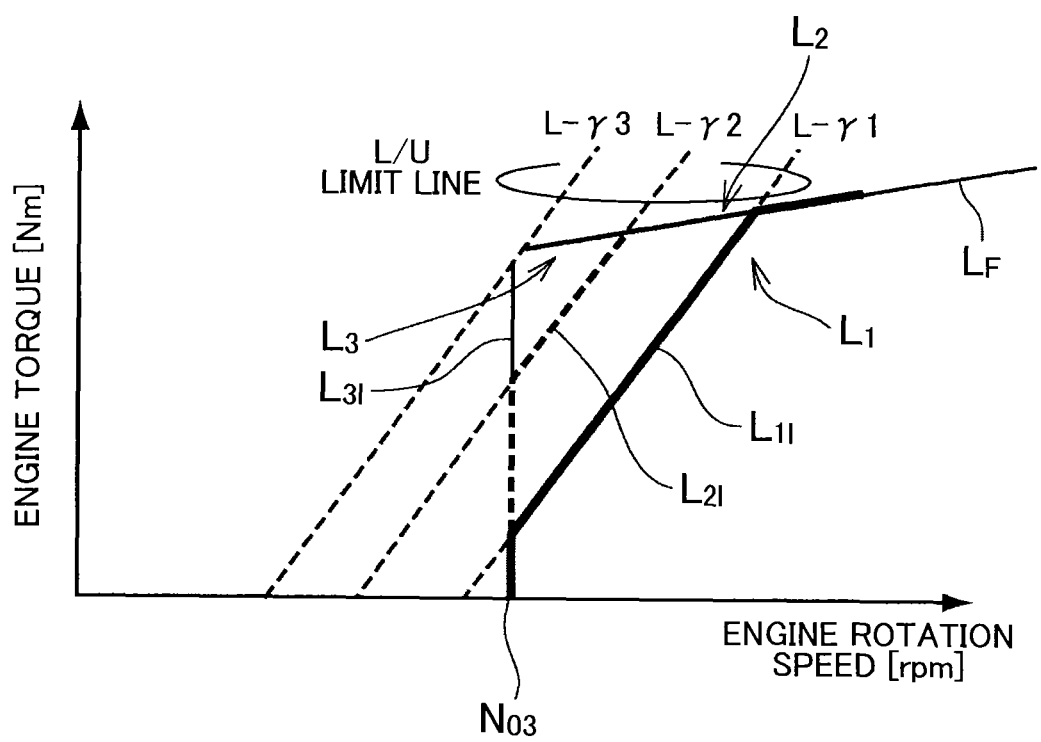
FIG. 10 is a graph that schematically shows another example of operating lines that are used in the embodiment of the invention.

The operating line in the embodiment of the invention is selected on the basis of the speed ratio equivalent value and just needs to be configured to allow the low power-side operating point of the engine 1 to be set to a low rotation speed side or a high torque side. FIG. 10 shows another example of operating lines. In the example illustrated here, the minimum rotation speed No3 corresponding to the above-described third speed ratio γ3 is the lower limit rotation speed of the engine 1. Therefore, the first operating line L1 is configured to keep the operating point on the speed ratio γ1 between the operating points on the optimal fuel consumption line and the operating points at the lower limit rotation speed No3. Similarly, the second operating line L2 is configured to keep the operating point on the speed ratio γ2 between the operating points on the optimal fuel consumption line and the operating points at the lower limit rotation speed No3. In other words, the minimum rotation speeds at the operating lines L1 to L3 each are the same lower limit rotation speed (minimum output rotation speed) No3, and low torque operating lines L1*l*, L2*l*, L3*l* are set between the optimal fuel consumption line and the lower limit rotation speed No3 on a higher output torque side as the speed ratio γ increases. When described as an operating point at a predetermined engine torque (output torque), the operating point on the low torque operating line L2*l* of the second operating line L2 is lower in rotation speed than the operating point on the low torque operating line L1*l* of the first operating line L1. Similarly, the operating point on the low torque operating line L3*l* of the third operating line L3 is lower in rotation speed than the operating point on the low torque operating line L2*l* of the second operating line L2. In this case as well, the lockup limit lines L-γ1, L-γ2, L-γ3 corresponding to the first to third speed ratios γ1 to γ3 are set on the basis of the above-described NV characteristics. Therefore, each of the lockup limit lines L-γ1, L-γ2, L-γ3 defines a range in which the lockup clutch 8 is released in the case where a speed ratio is larger than the speed ratio corresponding to the lockup limit line.

Even when the operating line is configured as shown in FIG. 10, the operating line that is selected in the case where the speed ratio is large is the operating line for setting a low rotation speed-side or high torque-side operating point as a result of improvement of the vibration damping performance of the damper mechanism 5. Therefore, the operation of the engine 1 at a low rotation speed side or high torque side is allowed in response to the speed ratio, and becomes close to operation on the optimal fuel consumption line, so it is possible to improve fuel consumption. Of course, it is possible to avoid or suppress deterioration of the NV characteristics.

Figure 11:
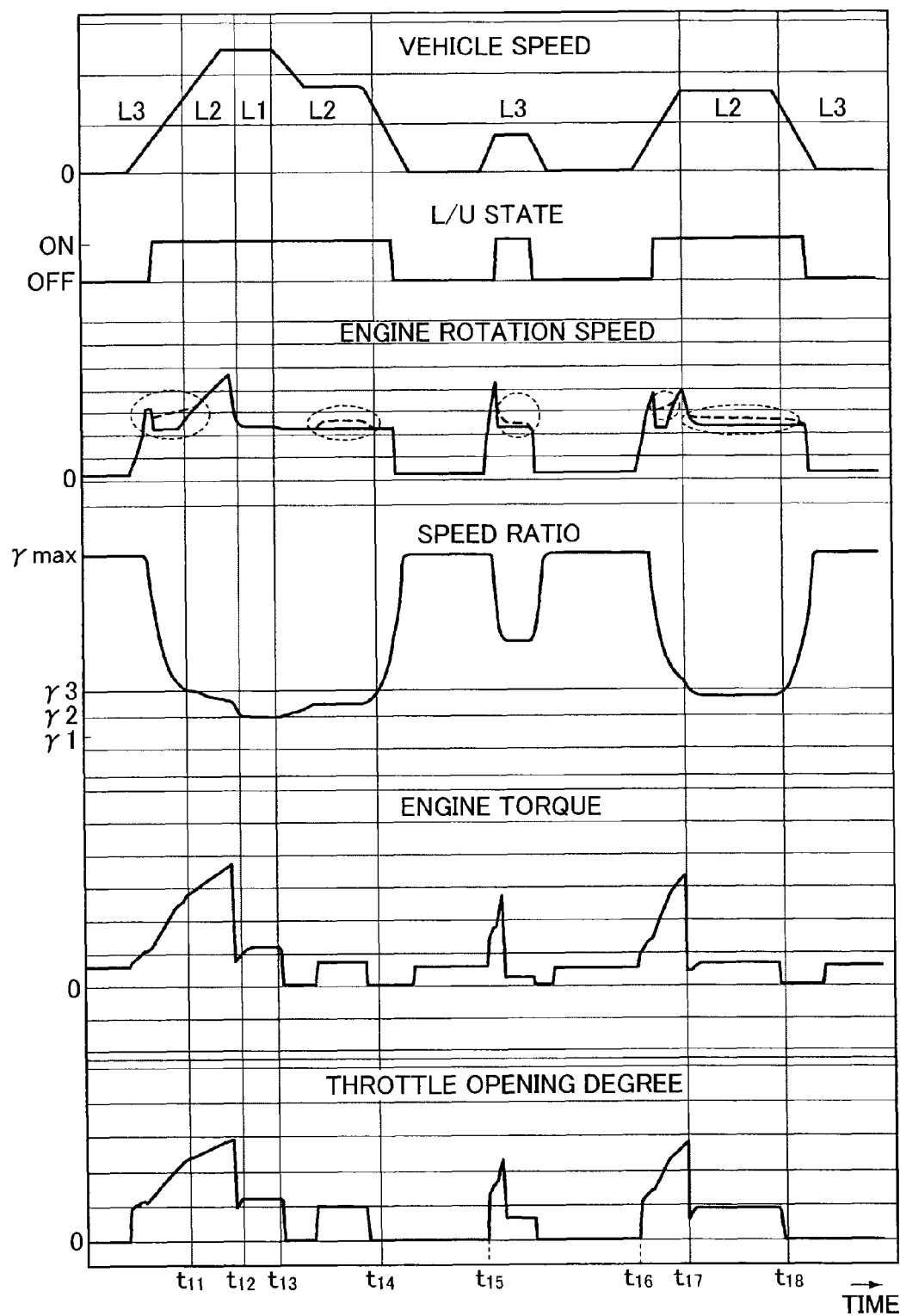
FIG. 11 is a time chart that shows an example of changes in the behavior of the vehicle in the case where the operating lines shown in FIG. 10 are used.

An example of the behavior of the vehicle in the case where any one of the operating lines L1 to L3 shown in FIG. 10 is selected and control based on the selected one of the operating lines L1 to L3 is executed will be described with reference to FIG. 11. The pattern of a change in the vehicle speed in the example shown in FIG. 11 is similar to the example shown in FIG. 9. Before the vehicle starts moving, the engine 1 is operating at idle, and is outputting a slight torque. In this state, the vehicle speed and the throttle opening degree are zero, the lockup clutch 8 is in the lockup off state (L/U: OFF), and the speed ratio γ is the maximum speed ratio γmax. Therefore, the above-described third operating line L3 is selected as the operating line.

When the accelerator pedal (not shown) is depressed and the throttle opening degree increases, the engine torque and the engine rotation speed gradually increase, and the vehicle starts moving. With an increase in the vehicle speed, the speed ratio γ gradually reduces. In this process, the lockup clutch 8 is switched into the lockup on state (L/U: ON). At this time, the engine rotation speed slightly decreases. Because the third operating line L3 is employed, the engine rotation speed does not increase but the engine rotation speed is kept at the predetermined minimum rotation speed No3. Therefore, the engine torque based on the engine power at that time increases, and the driving torque of the vehicle increases. The region is surrounded by the dashed line in FIG. 11. After that, the engine rotation speed increases in response to a change in the operating point along the third operating line L3.

When the speed ratio γ reduces with an increase in the vehicle speed and the above-described speed ratio equivalent value becomes smaller than or equal to the above-described third speed ratio γ3, the operating line is shifted to the above-described second operating line L2 (time t11). Because the accelerator pedal is still depressed and the throttle opening degree is large, the vehicle is in an accelerating state, and the engine rotation speed and the vehicle speed further continue increasing. When the accelerator pedal is returned because of the fact that the vehicle speed has reached the predetermined vehicle speed and the vehicle shifts into constant speed traveling, the engine torque and the engine rotation speed decrease, and the speed ratio γ reduces. When the speed ratio γ reaches the above-described second speed ratio γ2 or becomes smaller than or equal to the second speed ratio γ2 (time t12), the operating line is shifted to the above-described first operating line L1. At this time, accelerating force is not particularly required, so the engine 1 is operated at the operating point on the above-described optimal fuel consumption line.

After that, when the throttle opening degree is reduced for deceleration, the operating point of the engine 1 changes along the optimal fuel consumption line toward a low rotation speed and low torque side. The vehicle speed gradually starts decreasing. In the process of such a change, when the speed ratio γ becomes larger than the above-described second speed ratio γ2, the operating line is shifted to the second operating line L2 (time t13). After that, the throttle opening degree is kept at a predetermined opening degree such that the vehicle speed is kept. In the state where the vehicle speed is kept in this way, the engine 1 is operated along the optimal fuel consumption line. The second operating line L2 in this case is set on a higher output torque side than the first operating line L1, so the engine rotation speed corresponding to the output torque decreases in response to a shift of the operating line. That is, the engine 1 is operated at a lower rotation speed-side operating point on the optimal fuel consumption line. In this case, if the engine 1 is operated at the operating point on the first operating line L1 without shifting the operating line, the engine rotation speed increases and the operating point falls outside the optimal fuel consumption line, so fuel consumption deteriorates. In other words, as a result of the fact that the operating line is shifted as described above in response to the speed ratio γ, fuel consumption improves. The regions in which fuel consumption improves are surrounded by the dashed lines in FIG. 11.

When the throttle opening degree is reduced toward zero from the state where the vehicle speed is kept, the vehicle speed decreases, and the speed ratio γ gradually increases toward the maximum speed ratio γmax that is the speed ratio during a stop of the vehicle. In this process, when the speed ratio γ exceeds the above-described third speed ratio γ3, the operating line is shifted to the above-described third operating line L3 (time t14). When the engine rotation speed becomes lower than a predetermined lockup lower limit rotation speed, the lockup clutch 8 is released. Therefore, the engine 1 is operated at a lower rotation speed when the lockup clutch 8 is released than when the lockup clutch 8 is engaged.

After the vehicle is stopped, when the accelerator pedal is depressed to cause the vehicle to move slightly forward (time t15), the engine torque, the engine rotation speed and the vehicle speed increase. The accelerator pedal is returned because of the fact that the vehicle speed is close to a vehicle speed intended by a driver, the throttle opening degree is reduced and is set to an opening degree at which the intended low vehicle speed is kept. In this case, because the above-described third operating line L3 is employed, the operating point of the engine 1 becomes the operating point on the optimal fuel consumption line of the third operating line L3. The lockup clutch 8 is engaged. Therefore, the engine rotation speed becomes a low rotation speed, and fuel consumption improves. The operating region in which such an advantageous effect is obtained is surrounded by the dashed line in FIG. 11. Although the lockup clutch 8 is engaged, the vibration damping performance of the damper mechanism 5 is improved because of the fact that the speed ratio γ is large, so the NV characteristics of the vehicle do not particularly deteriorate.

After the throttle opening degree is reduced to zero and the vehicle is stopped, when the accelerator pedal is depressed to cause the vehicle to start moving again and the throttle opening degree increases (time t16), as described above in the case where the vehicle starts moving, the engine torque, the engine rotation speed and the vehicle speed gradually increase, and the speed ratio γ gradually reduces from the maximum speed ratio γmax. The lockup clutch 8, which has been released during a stop of the vehicle, is engaged in this process, the engine rotation speed temporarily decreases accordingly, and then the engine rotation speed gradually increases. As shown in FIG. 10, part of the low torque operating line L3*l* of the third operating line L3 coincides with the lockup limit line L-γ3 corresponding to the third speed ratio γ3. Therefore, the engine rotation speed after lockup is set to the rotation speed based on the low torque operating line L3*l*, and the operating point is higher in torque than the operating points on the first operating line L1 or the operating points on the second operating line L2. Therefore, fuel consumption improves, and a large driving torque is obtained as a result of an increase in engine torque. The region in which fuel consumption and driving torque are improved in this way is surrounded by the dashed line in FIG. 11.

When the throttle opening degree is reduced in order to keep the vehicle speed at the intended vehicle speed (time t17), the target power of the engine 1, which is obtained on the basis of the accelerator operation amount, decreases, and the speed ratio γ reduces accordingly. When the speed ratio γ becomes smaller than the above-described third speed ratio γ3, the operating line that controls the engine 1 is shifted from the third operating line L3 to the second operating line L2. That is, it is possible to set the operating point at a lower engine rotation speed on the optimal fuel consumption line. Therefore, in this case as well, it is possible to improve fuel consumption by setting the engine rotation speed to a rotation speed lower than the rotation speed (rotation speed indicated by the dashed line in FIG. 11) in the case where the engine 1 is controlled by using the above-described first operating line L1. In addition, it is possible to increase the engine torque. Because the lockup clutch 8 is engaged, it is possible to improve fuel consumption by suppressing a power loss. Because the vibration damping performance of the damper mechanism 5 is improved by the increased speed ratio γ, the NV characteristics of the vehicle do not deteriorate. The region in which fuel consumption improves is surrounded by the dashed line in FIG. 11. When the throttle opening degree is reduced to zero in order to stop the vehicle, the engine torque and the engine rotation speed decrease, and the vehicle speed decreases, as in the case of the above-described stop of the vehicle. The speed ratio γ increases toward the maximum speed ratio γmax, and, in this process, the third operating line L3 is selected (time t18), and the lockup clutch 8 is released.

Figure 12:
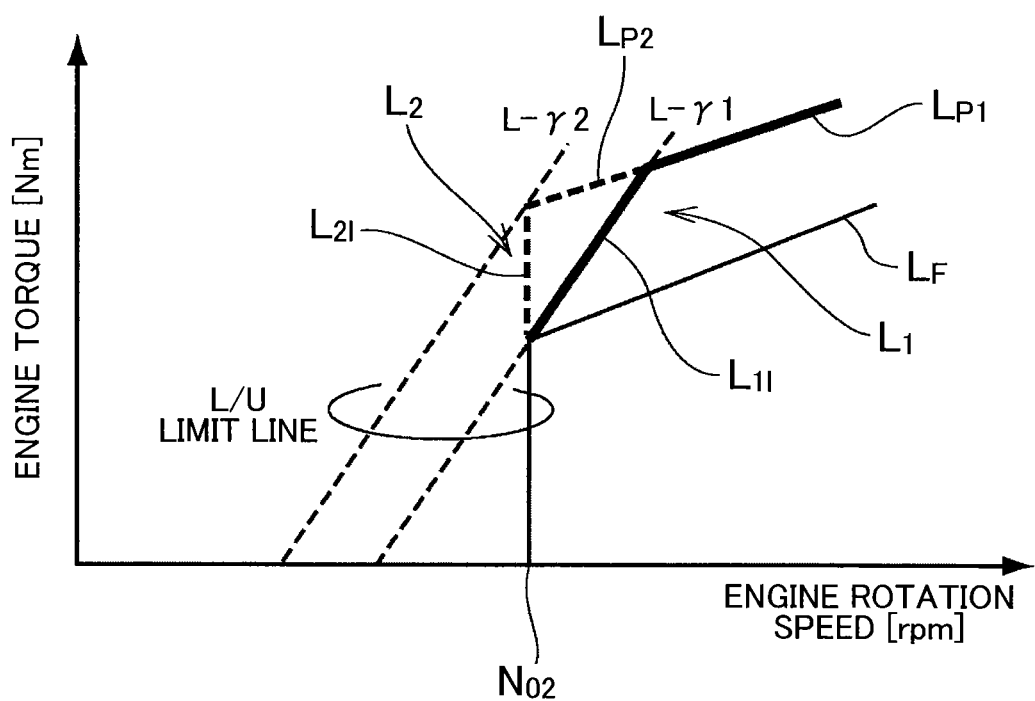
FIG. 12 is a graph that schematically shows further another example of operating lines that are used in the embodiment of the invention.

FIG. 12 shows further another example of operating lines in the embodiment of the invention. The example illustrated here is an example of operating lines that are employed when a sporty drive mode in which the behavior of the vehicle is quick, a hill-climbing mode in which driving force increases, or the like, is selected. In these drive modes, an increase in driving force is given higher priority than improvement in fuel consumption because a large driving force is required, so an ordinary operating line is higher in torque than the optimal fuel consumption line. This high torque-side operating line Lp1 is an operating line obtained by shifting the above-described first operating line L1 toward a high output torque side. A second high torque-side operating line Lp2 is an operating line obtained by shifting the above-described second operating line L2 toward a high output torque side and limiting the lower limit rotation speed to the predetermined minimum rotation speed No2. The low torque operating line L1*l* of the first operating line L1 is set as a line that coincides with the lockup limit line L-γ1 corresponding to the first speed ratio γ1. The low torque operating line L2*l* of the second operating line L2 is a line that is continuous with the second high torque-side operating line Lp2 at a point at which the lockup limit line L-γ2 corresponding to the second speed ratio γ2 intersects with the second high torque-side operating line Lp2. Therefore, when described as the operating point at a predetermined engine torque (output torque), the operating point on the low torque operating line L2*l* of the second operating line L2 is lower in rotation speed than the operating points on the low torque operating line L1*l* of the first operating line L1.

Therefore, it is possible to operate the engine 1 at a lower rotation speed-side or higher torque-side operating point when the speed ratio γ is large in the sporty drive mode, the hill-climbing mode, or the like, than when the speed ratio γ is small. In this case, because the vibration damping performance of the damper mechanism 5 is improved by the increased speed ratio γ, a situation, such as deterioration of the NV characteristics, is avoided or suppressed even when the engine rotation speed is a low rotation speed or the engine torque is large. That is, it is possible to improve drivability while achieving desired vibration damping performance. The operation of the engine at a high torque side is allowed, so it is possible to improve the fuel consumption of a high-torque engine, such as a diesel engine and a supercharged engine. When the operating line is changed in response to the traveling state or drive mode of the vehicle, the flexibility of selection of the operating line improves. As described above, because it is possible to improve the vibration damping performance of the damper mechanism, necessary and sufficient vibration damping performance is obtained even with the use of a small-sized or low-cost damper mechanism. Therefore, it is possible to reduce the size or cost of the damper mechanism or the overall configuration of a powertrain including the damper mechanism.

Figure 13A:
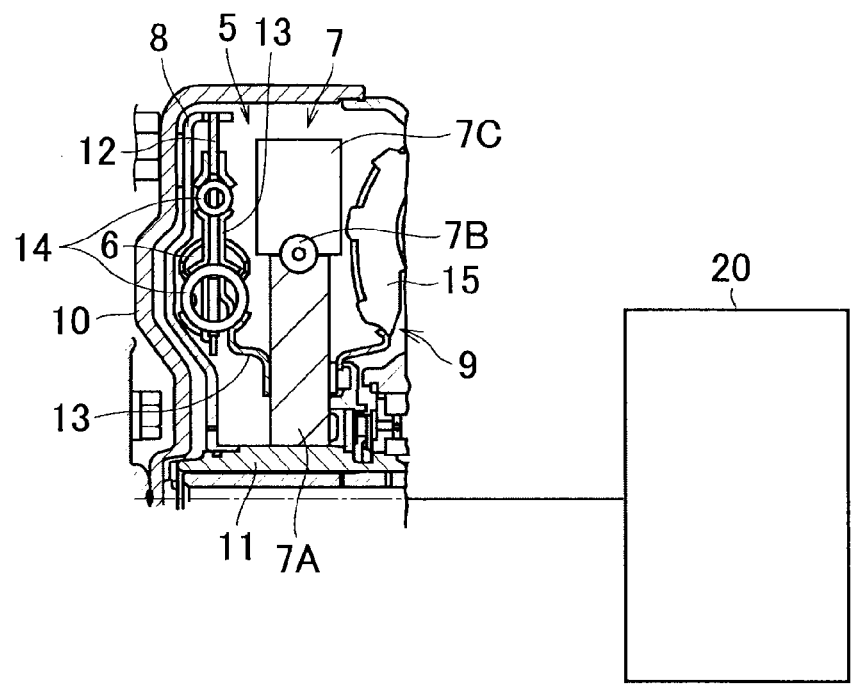
FIG. 13A is a partially cross-sectional view that shows another example of the damper mechanism of the vehicle to which the invention is applicable.
Figure 13B:
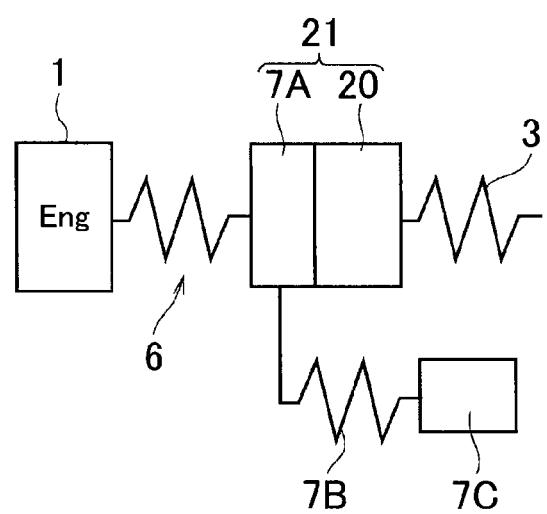
FIG. 13B is a block diagram rewritten as a vibration system.

The vehicle to which the invention is applicable is a vehicle including a dynamic damper as described above, and the dynamic damper just needs to be coupled to an engine via a spring damper and be coupled to a transmission unit by the use of a member that may be regarded as a rigid body as compared to a spring. Therefore, the dynamic damper may be configured such that a damper mass is supported by a spring. An example of the above configuration is shown in FIG. 13A and FIG. 13B. FIG. 13A is a schematic cross-sectional view. FIG. 13B is a block diagram. In the example illustrated here, a base portion 7A of the dynamic damper 7 is integrated with the input shaft 11, a damper mass 7C is coupled to the outer peripheral portion of the base portion 7A via a spring 7B that elastically extends or contracts in a rotation direction. Therefore, the damper mass 7C repeatedly compresses or stretches the spring 7B to oscillate in the rotation direction. The remaining configuration is similar to the configuration described with reference to FIG. 2.

Figure 14A:
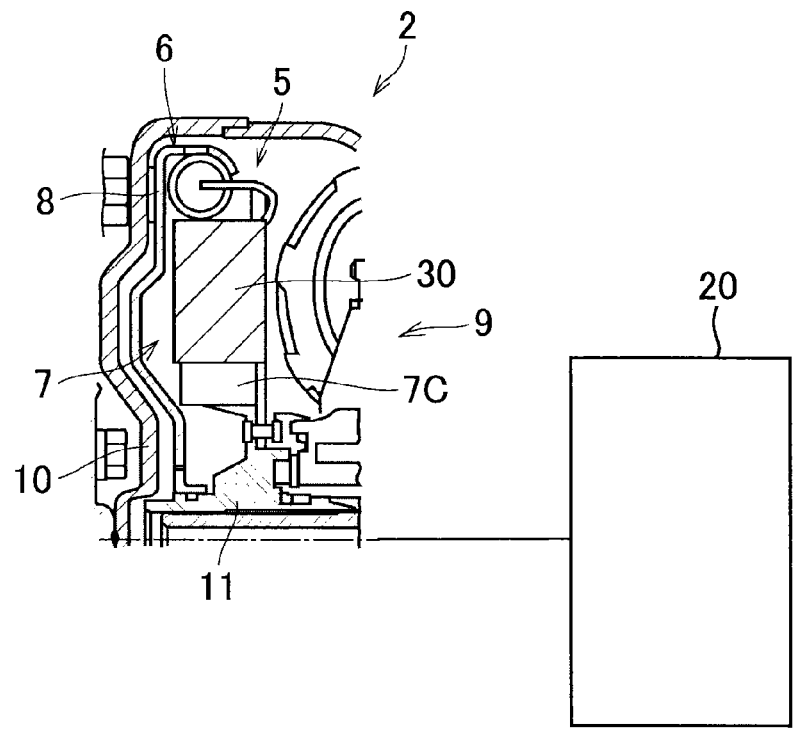
FIG. 14A is a partially cross-sectional view that shows further another example of the damper mechanism of the vehicle to which the invention is applicable.
Figure 14B:
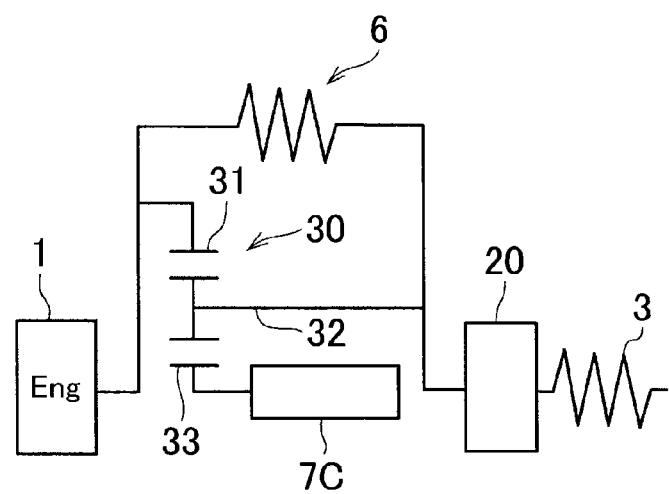
FIG. 14B is a block diagram rewritten as a vibration system.

An example of the dynamic damper 7 shown in FIG. 14A and FIG. 14B is an example configured such that a torque fluctuation is suppressed by setting a phase difference between the rotation of the engine 1 and the rotation of the damper mass. FIG. 14A is a schematic cross-sectional view. FIG. 14B is a block diagram. A planetary gear mechanism 30 is arranged between the engine 1 and the damper mass 7C. The engine 1 is coupled to a ring gear 31 in the planetary gear mechanism 30. Specifically, the planetary gear mechanism 30 is arranged inside the torque converter 9, and the lockup clutch 8 is coupled to the ring gear 31. The driven plate 13 in the spring damper 6 is coupled to a carrier 32. The damper mass 7C is fixed to a sun gear 33. Therefore, because the spring damper 6 is interposed between the ring gear 31 and the carrier 32 in the planetary gear mechanism 30, when there occurs torsion in the spring damper 6 due to a torque fluctuation, relative rotation occurs between the ring gear 31 and the carrier 32. As a result, the damper mass 7C relatively rotates by a further larger amount with respect to the engine 1. Such relative rotation occurs because of the torsion in the spring damper 6, so the damper mass 7C eventually oscillates in the rotation direction. The remaining configuration is similar to the configuration described with reference to FIG. 2.

Therefore, even in a vehicle including a drive line having the configuration shown in FIG. 13A and FIG. 13B or the configuration shown in FIG. 14A and FIG. 14B, the moments of inertia of the turbine runner 15, the transmission unit 20, and the like, are included in the mode moment of inertia M of the main vibration system, so vibration damping performance improves in response to an increase in speed ratio equivalent rotation speed. The operating lines shown in FIG. 7 or FIG. 12 are set by utilizing the function, and control is executed as shown in FIG. 8. Thus, it is possible to expand a so-called lockup range to a low rotation speed range, improve fuel consumption or operate the engine in a high torque range.

As described above, the control system according to the embodiment of the invention is configured to set a plurality of operating lines such that the NV characteristics do not deteriorate by utilizing the fact that the vibration damping characteristic changes in response to the speed ratio in the transmission unit, select one of the operating lines in response to the traveling state of the vehicle and operate the engine. The vibration damping characteristic changes in response to a rotation speed that may be regarded as a speed ratio. Therefore, in the above-described specific example, mainly, the operating line is configured to be selected on the basis of the speed ratio.

In the invention, instead of the speed ratio, the operating line may be selected on the basis of an appropriate rotation speed that is determined by the speed ratio or the ratio of appropriate rotation speeds. The rotation speed may be, for example, the output rotation speed of the transmission unit 20, the rotation speed of the turbine runner in the torque converter 9, the rotation speed of an appropriate rotary member that constitutes the transmission unit 20, or the like. The rotation speed ratio may be the ratio of the rotation speeds of any two of them. The rotation speed, rotation speed ratio, the value of the speed ratio itself, or the like, corresponds to a speed ratio equivalent value in the embodiment of the invention.

The operating line that is selected on the condition that the speed ratio equivalent value is large is an operating line configured such that a power that is required or targeted at that time is output at a lower rotation speed. A power that the engine outputs is expressed by the product of the rotation speed and the torque, so the output torque relatively increases at an operating point at which the rotation speed is relatively small among operating points at which the same power is output. Therefore, in the invention, the operating line that is selected on the condition that the speed ratio equivalent value is large may be regarded as an operating line on which the output torque increases as compared to the operating line that is selected on the condition that the speed ratio equivalent value is small.

The spring damper in the embodiment of the invention may be not a spring damper connected to the lockup clutch but a spring damper provided in a clutch that connects the engine with the transmission unit.

What is claimed is:

1. A control system for a vehicle in which a transmission unit, including a continuously variable transmission unit that is able to continuously change a speed ratio, is coupled to an engine via a fluid coupling including a lockup clutch, a spring damper is provided between the transmission unit and the lockup clutch, a dynamic damper is provided in the transmission unit, the dynamic damper includes a base portion and a mass body that oscillates with respect to the base portion, the base portion is coupled to the transmission unit such that a moment of inertia of the transmission unit is included in a moment of inertia of the base portion, the control system comprising:
   a controller configured to control an operating point of the engine, which is an optimal operating condition of the engine represented on a map and determined by an output torque and an output rotation speed of the engine and a predetermined speed ratio equivalent value,
   the controller being configured to obtain a speed ratio equivalent value that is determined by at least one predetermined speed ratio equivalent value set in the transmission unit and is a ratio of, an output ratio between a predetermined output rotation speed of the engine and a predetermined output rotation speed of the transmission unit, and a predetermined output rotation speed of the engine, and
   the controller being configured to control the engine by setting the operating point of the engine such that a first operating point for a first predetermined speed ratio equivalent value is less than a second operating point for a second predetermined ratio equivalent value in a case where the lockup clutch is engaged and the first predetermined speed ratio equivalent value is greater than the second predetermined speed ratio equivalent value.

2. The control system according to claim 1, wherein
   the map includes at least two operating lines, a first operating line and a second operating line, as operating lines for controlling the operating point of the engine,
   the second operating line is lower in the output rotation speed for the predetermined output torque than the first operating line, the controller is configured to calculate a calculated speed ratio value based on an output rotation speed of the transmission unit and the output rotation speed of the engine, the controller is configured to, when the lockup clutch is engaged and the calculated speed ratio value is greater than the predetermined ratio equivalent value, operate the engine at an operating point on the second operating line, and the controller is configured to, when the lockup clutch is engaged and the calculated speed ratio value is smaller than or equal to the predetermined ratio equivalent value, operate the engine at an operating point on the first operating line.

3. The control system according to claim 2, wherein each of the first operating line and the second operating line is composed of an optimal fuel consumption line that connects predetermined optimal fuel consumption operating points, and a low torque operating line that is continuous with the optimal fuel consumption line at a low output rotation speed side and that connects operating points that are lower in output torque than the operating points on the optimal fuel consumption line, and the low torque operating line of the second operating line is lower in the output rotation speed for the predetermined output torque than the low torque operating line of the first operating line.

4. The control system according to claim 3, wherein a minimum output rotation speed of the second operating line is lower than a minimum output rotation speed of the first operating line.

5. The control system according to claim 3, wherein a minimum output rotation speed of the second operating line is equal to a minimum output rotation speed of the first operating line, and the output torque of an operating point at the minimum output rotation speed of the second operating line is greater than the output torque of an operating point at the minimum output rotation speed of the first operating line.

6. The control system according to claim 2, wherein each of the first operating line and the second operating line is composed of a first torque operating line set on a first output torque side of an optimal fuel consumption line that connects predetermined optimal fuel consumption operating points, and a second torque operating line that is continuous with the first torque operating line at a second output rotation speed side and that connects operating points that are lower in output torque than the operating points on the first torque operating line, and the second torque operating line of the second operating line has an output rotation speed for the predetermined output torque less than the second torque operating line of the first operating line.

7. The control system according to claim 6, wherein a minimum output rotation speed of the second operating line is less than a minimum output rotation speed of the first operating line.

8. The control system according to claim 6, wherein a minimum output rotation speed of the second operating line is equal to a minimum output rotation speed of the first operating line, and the output torque of an operating point at the minimum output rotation speed of the second operating line is greater than the output torque of an operating point at the minimum output rotation speed of the first operating line.

9. The control system according to claim 1, wherein the controller is configured to, in a state where the lockup clutch is released, set a rotation less lower than a minimum rotation speed of the engine, which is settable in a state where the lockup clutch is engaged.

10. The control system according to claim 1, wherein the dynamic damper is any one of a pendulum damper in which a pendulum that serves as the mass body is coupled to the base portion, a damper in which the mass body is coupled to the base portion via a spring, and a damper in which the engine is coupled to any one of three rotating elements in a differential mechanism that performs differential action with the use of the three rotating elements, the spring damper is coupled to another one of the rotating elements and the mass body is coupled to the other one of the rotating elements.

* * * * *